United States Patent
Kobayashi et al.

(10) Patent No.: US 7,203,143 B2
(45) Date of Patent: Apr. 10, 2007

(54) SLEW RATE LIMITING CIRCUIT AND OPTICAL DISC APPARATUS

(75) Inventors: Makoto Kobayashi, Tokyo (JP); Koji Tomioka, Sagamihara (JP); Kazunari Sasaki, Yokohama (JP)

(73) Assignee: Asahi Kasei Microsystems Co., Ltd., Tokyo (JP)

( * ) Notice: Subject to any disclaimer, the term of this patent is extended or adjusted under 35 U.S.C. 154(b) by 117 days.

(21) Appl. No.: 10/513,514

(22) PCT Filed: May 16, 2003

(86) PCT No.: PCT/JP03/06145

§ 371 (c)(1),
(2), (4) Date: Nov. 5, 2004

(87) PCT Pub. No.: WO03/098798

PCT Pub. Date: Nov. 27, 2003

(65) Prior Publication Data

US 2005/0180299 A1     Aug. 18, 2005

(30) Foreign Application Priority Data

May 16, 2002  (JP) .............................. 2002-141733
Jan. 17, 2003  (JP) .............................. 2003-010018

(51) Int. Cl.
*G11B 7/00*   (2006.01)

(52) U.S. Cl. ................................. 369/47.28; 369/47.26

(58) Field of Classification Search ............. 369/41.01, 369/44.11, 44.13, 44.34, 44.29, 47.17, 47.28
See application file for complete search history.

(56) References Cited

U.S. PATENT DOCUMENTS 4,689,779 A * 8/1987 Hayashi et al. .......... 369/44.32

(Continued)

FOREIGN PATENT DOCUMENTS

JP       03-160673       7/1991

(Continued)

OTHER PUBLICATIONS

Tsunekawa, Masao, Servo control circuit for disk drive, JP 03-160673 A.*

*Primary Examiner*—Wayne Young
*Assistant Examiner*—Minerva Rivero
(74) *Attorney, Agent, or Firm*—Finnegan, Henderson, Farabow, Garrett & Dunner, L.L.P.

(57) ABSTRACT

In a slew rate limiter, a slew rate is limited so as not to pass a signal varying more abruptly than a wobble signal included in a difference signal generated by a differential amplifier, and this limited slew rate is used to process the difference signal to be outputted. That is, the slew rate limiter removes a signal varying more abruptly than a wobble signal included in a difference signal DIFO, and then outputs only the wobble signal. A DAC generates an offset voltage. An adder is used to add this offset voltage to the wobble signal from the slew rate limiter. The signal obtained by this addition as a slice level is compared by a comparator with the difference signal, thereby reproducing an LPP signal.

19 Claims, 8 Drawing Sheets

U.S. PATENT DOCUMENTS

| | | | |
|---|---|---|---|
| 5,020,044 A * | 5/1991 | Shimonou | 369/44.28 |
| 5,675,558 A * | 10/1997 | Katoh | 369/30.15 |
| 5,784,356 A * | 7/1998 | Hayashi et al. | 369/47.25 |
| 6,487,149 B1 * | 11/2002 | Yokoi et al. | 369/47.25 |
| 6,552,979 B1 * | 4/2003 | Mokry et al. | 369/47.38 |

FOREIGN PATENT DOCUMENTS

| | | |
|---|---|---|
| JP | 07-162277 | 6/1995 |
| JP | 07-296395 | 11/1995 |
| JP | 2000-182257 | 6/2000 |
| JP | 2001-312823 | 11/2001 |
| JP | 2002-216363 | 8/2002 |

* cited by examiner

FIG. 6A  DIFO

SLEW RATE LIMITING CIRCUIT AND OPTICAL DISC APPARATUS

TECHNICAL FIELD

The present invention relates to a slew rate limiter for limiting a slew rate of an abnormal component included in an input signal when the slew rate of the abnormal component is large enough to cause an abrupt change in the level of the input signal, and for removing such abnormal component from the output signal as much as possible. The invention also relates to an optical disk device for recording and reproducing the data of document, image, music and the like on the optical disk, and more particularly, to an optical disk device suitable for use in the reproduction of a wobble signal and the detection of a LPP (land prepits) signal, the signals being recorded onto a recordable/reproducible optical disk.

BACKGROUND ART

Currently, there are recordable or write-once-read-many type optical disks such as CD-R/DVD-R and recordable optical disks such as CD-RW/DVD-RW, DVD-RAM, other than a reproduction-only optical disks such as CD and DVD. When recording information onto such recordable optical disks, a reference clock signal for the writing cannot be generated from the reproduction signal used in the conventional reproduction-only disks.

Figure 8:
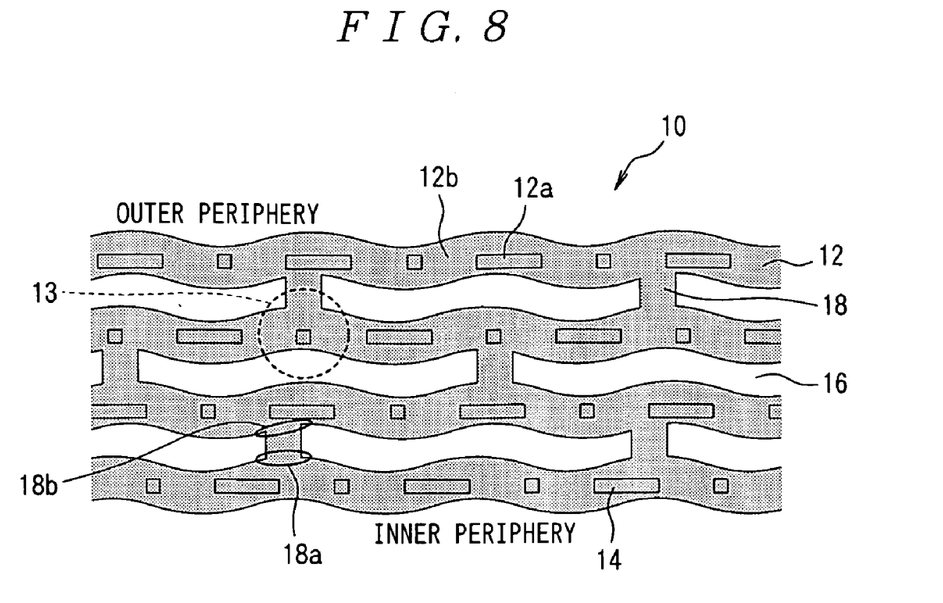
FIG. 8 shows a construction of an optical disk.

Therefore, the recordable optical disk is constructed as shown in FIG. 8. FIG. 8 shows a part of the surface of DVD-R/RW disk. On the optical disk (hereinafter also referred to as DVD-R/RW) 10, tracks (grooves) 12 which represent a section for recording information are spirally formed in a serpentine (wobbling) fashion with a specific amplitude and cycle. Such a track or groove is referred to as a wobble. When a laser spot 13 is irradiated on the serpentine grooves 12, a light reflected therefrom is detected with an optical detector (not shown) divided into the right and left sides in a push-pull manner, so that a difference of amounts of light can be detected. The signal detected in this manner is referred to as a wobble signal from which the reference clock signal for the writing can be generated.

Figure 9:
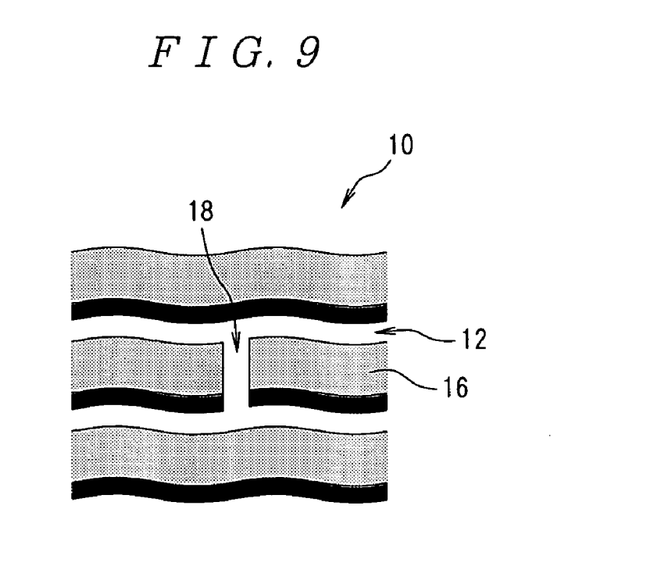
FIG. 9 is an enlarged view showing grooves, lands, and a LPP of the optical disk.

The grooves 12 are formed in such a manner that a number of pit data 14 representing a variety of information can be written therein, and notched parts called land prepits (hereinafter referred to as LPP) 18 are provided in the land parts 16 between the grooves 12, as also shown in FIG. 9.

In the case of CD-R/RW, the wobbled grooves are also formed as described above. The wobble signal of CD-R/RW is a continuous signal having a frequency of 22.05 kHz±1 kHz at the time of unmultiplied speed. In the case of CD-R/RW, the address information referred to as ATIP (Absolute Time In Pregroove) is superimposed by means of the frequency modulation (FM) on the wobble signal which thereby has a certain frequency bandwidth.

On the other hand, contrary to CD-R/RW, the wobble signal in the case of DVD-R/RW 10 has a single frequency of 140.65 kHz (in the case of unmultiplied speed) with no address information being superimposed thereon, so that the LPP signal obtained from the LPP 18 is used as the address information.

On a portion where the LPP 18 is formed, the land parts on one side are configured to be discontinuous. For this reason, during passage through the discontinuous portion, the amount of light incident upon the optical detectors on both sides of the right and left will steeply change, so that as a result of the push pull, a pulse-form signal will be superimposed as the LPP signal on the wobble signal.

As shown in FIG. 8, a portion (hereinafter referred to as LPP outer peripheral connection part) 18a connected to the outer peripheral side of the groove 12 in the LPP 18 is arranged to overlap with a sufficient accuracy with the maximum amplitude position of the wobble of the groove 12, and to continue to occur for at most three wobbles. A portion (hereinafter referred to as LPP inner peripheral connection part) 18b connected to the inner peripheral side of the groove 12 in the LPP 18 is not always arranged in the maximum amplitude position of the wobble but rather arranged irregularly in such positions as the minimum amplitude position of the wobble or positions between the maximum and minimum amplitudes of the wobble. However, there may be a case where such LPP inner peripheral connection part 18b continues to occur for at most three wobbles.

As a result, the address information is recorded onto DVD-R/RW 10 in combination with the LPP signals for three periods of the LPP outer peripheral connection part 18a.

In order to extract a wobble signal stably and detect a LPP signal with less mistake from a signal formed by the combination of such wobble and LPP components, it will be required to reduce the leaking of the recorded signal components. In addition, there has been a trend for attaining the high multiple speed of reproduction in DVD-R/RW as well as in CD-R/RW. To this end, it is necessary that the frequency band of LPF (Low Pass Filter) and BPF (Band Pass Filter) and the LPP extraction circuit, which are used in a wobble and LPP signal reproduction circuit, are switched in association with the multiple speed so as to effect the extraction of the wobble and LPP signals.

Figure 10:
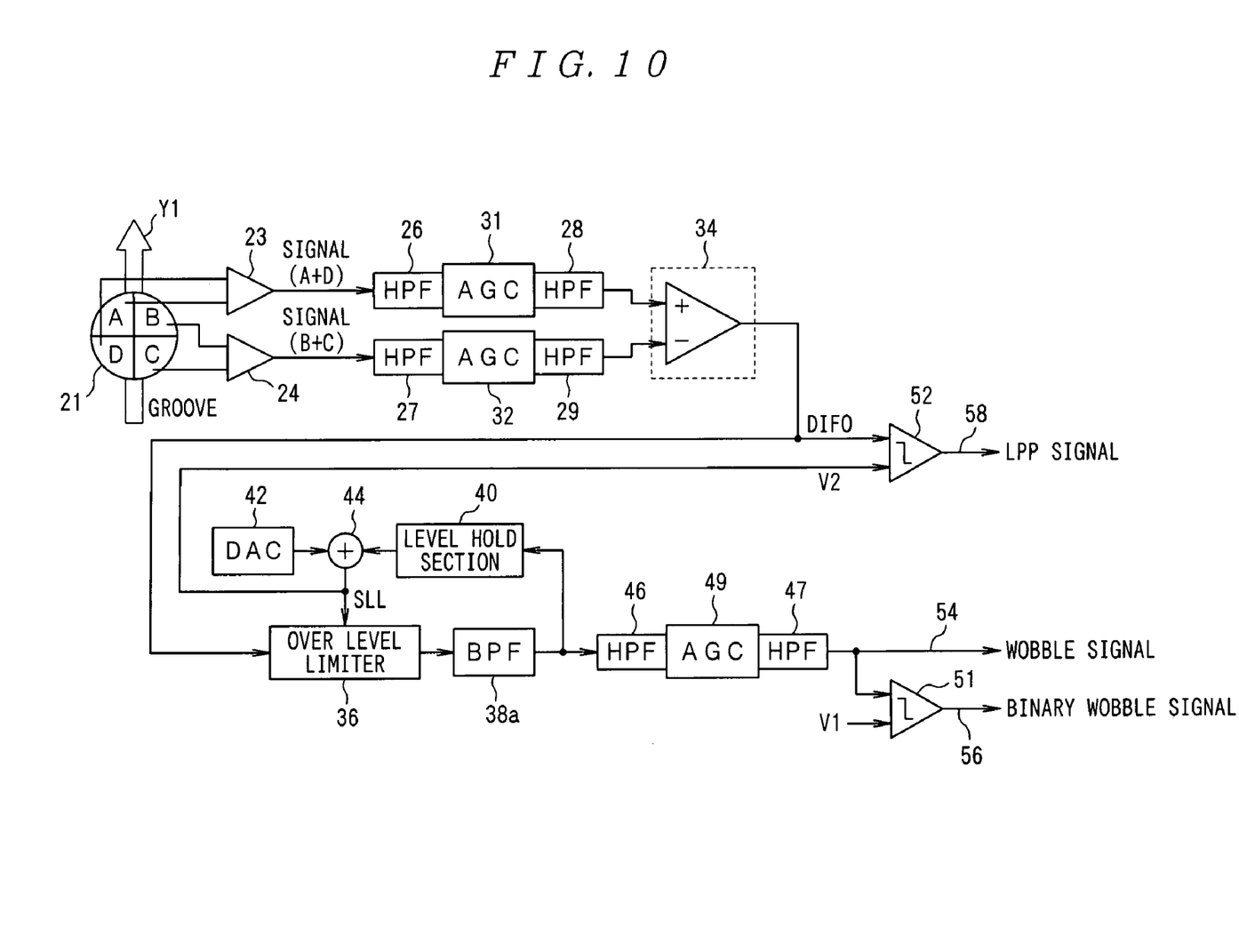
FIG. 10 is a block diagram showing a construction of the wobble and LPP signal reproduction circuit of the prior art optical disk device.

FIG. 10 shows a construction of the wobble and LPP signal reproduction circuit employed in the conventional optical disk device. In the following, the wobble and LPP signal reproduction circuit may be abbreviated to the reproduction circuit.

The reproduction circuit 20 is constructed to comprise a quadripartite sensor 21, operational amplifiers 23, 24, AGCs (Auto Gain Controllers) 31, 32 to which input and output sides HPFs (High Pass Filters) 26, 27, 28, and 29 are connected, a gain variable differential amplifier 34 with a frequency variable LPF, an over level limiter 36, a BPF 38, a level hold section 40, a DAC (Digital Analog Converter) 42, an adder 44, an AGC 49 to which input and output sides HPFs 46, 47 are connected, and binary comparators 51, 52.

When the laser spot 13 is irradiated on the optical disk 10 as shown in FIG. 8, the reflected light will form a spot image on the quadripartite sensor 21 four-divided in a manner as shown by A, B, C, and D in FIG. 10. Here, the quadripartite sensor 21 first takes up signals A, B, C and D and then adds them in the circumferential direction to generate signals (A+D) and (B+C) in order to reproduce the wobble and LPP signals. The signal (A+D) is a signal on the left side (AD side) of the advancing direction of the groove 12 shown by an arrow head Y1 in the Figure, and the signal (B+C) is a signal on the right side (BC side).

The signals (A+D) and (B+C) are inputted into the HPFs 26, 27 in which their DC offset components are removed, and thereafter inputted into the AGCs 31, 32. In the AGCs 31, 32, in order to remove RF components and in-phase noise components, the amplitudes of both signals (A+D) and (B+C) are aligned. The signals (A+D) and (B+C), of which amplitudes have been adjusted to be constant, are inputted into the differential amplifier 34 by way of the HPFs 28, 29.

In the differential amplifier 34, the difference between the signals (A+D) and (B+C) is taken and processed by the frequency variable LPF with a predetermined gain, so as to be formed as a differential signal DIFO.

In processing of the differential amplifier 34, the difference between the signals (A+D) and (B+C) is taken to cancel out the pit data 14, and the gain for the wobble and LPP signals included in each of the signals (A+D) and (B+C) is increased so as to amplify the wobble and LPP signals.

The differential signal DIFO outputted from the differential amplifier 34 will include only the wobble signal component after the LPP signal component is removed by the over level limiter 36. This wobble signal 37 is outputted to the level hold section 40 and the HPF 46 through the BPF 38. Then, a DC offset component and a noise component, etc. included in the wobble signal are removed while passing from the HPF 46 via the AGC 49 and through the HPF 47, and the wobble signal is formed to have a constant amplitude. The wobble signal 54 is thereby reproduced.

The wobble signal 54 is inputted into the binary comparator 51 and is binarized by the comparison with a slice level V1, so as to be formed as a binary wobble signal 56.

A limit value SLL of the over level limiter 36 described above is generated as follows. That is, the peak and bottom levels of the output of the BPF 38 are held (peak held and bottom held) in the level hold section 40. A predetermined DC offset voltage outputted from the DAC 42 is added to each of the hold values by means of the adder 44, as a result of which the limit value SLL is generated.

The limit value SLL is also used as a slice level V2 of the binary comparator 52. That is, the slice level V2 is formed as the peak hold value or the bottom hold value, to each of which the offset voltage has been added. They are referred to as the peak hold value and the bottom hold value in the following, and it is assumed that each of them has been added with the offset voltage.

Figure 11A:
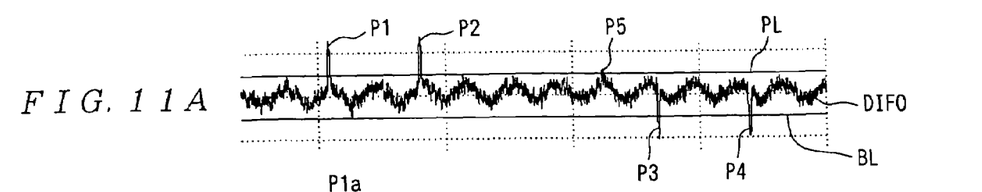
FIGS. 11A to 11C are views showing each signal in the wobble and LPP signal reproduction circuit of the prior art optical disk device.

The slice level V2 is compared in the binary comparator 52 with the differential signal DIFO, as a result of which the binarized LPP signal 58 is reproduced. Whether, in the case of the reproduction, the peak hold value or the bottom hold value is used as the slice level V2 which is inputted into the binary comparator 52, depends upon the polarity of the LPP component included in the differential signal DIFO. For example, the peak hold value PL is used for the LPP signals P1, P2 due to the LPP outer peripheral connection part 18a, because the signals appear in upward projecting pulse state, as shown in FIG. 11A. However, the bottom hold value BL is used for the LPP signals P3, P4 due to the LPP inner peripheral connection part 18b, because the signals appear in downward projecting pulse state when the signals are taken up with the opposite polarity.

Figures 11B, 11C:
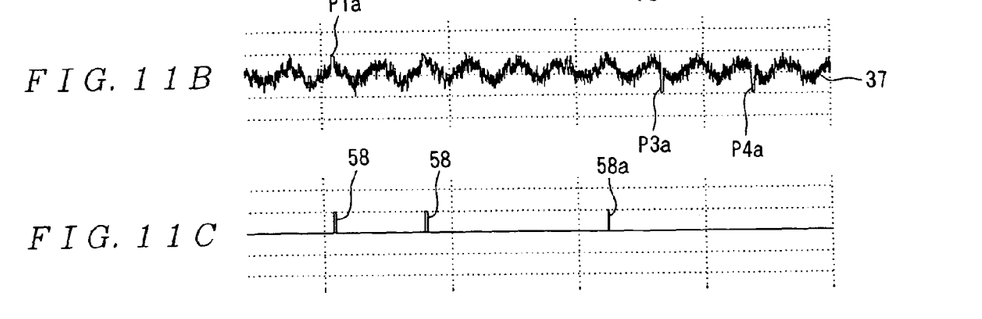

That is, as shown in FIG. 11A, the pulse state LPP signals P1, P2 superimposed on the differential signal DIFO can be removed by means of the peak hold value PL in the over level limiter 36. On the other hand, the pulse state LPP signals P3, P4 superimposed on the differential signal DIFO can be removed by means of the bottom hold value BL. With such operation, the wobble signal 37, as shown in FIG. 11B, is outputted from the over level limiter 36.

In the binary comparator 52, as shown in FIG. 11A, the differential signal DIFO is compared with the peak hold value PL for detecting the LPP signals P1, P2 which exceed the peak hold value PL, so as to form the detected signals to be binary LPP signals 58. A conventional optical disk device of this type is disclosed in Japanese Patent Laid-Open No. 7-296395 and No. 2002-216363.

However, the prior art optical disk device has the following problems. In the case where the LPP inner peripheral connection part 18b of the optical disk 10 is positioned in the vicinity of the center of the amplitude of the wobble, as shown in FIG. 11A, the LPP signals P3, P4 from the LPP inner peripheral connection part 18b in the vicinity of the center thereof will project from the vicinity of the center of the amplitude C1 of the differential signal DIFO. Even if the LPP signals P3, P4 are removed with the bottom hold value BL, some parts of the LPP signal components P3, P4 cannot be removed, as shown by P3a, P4a in FIG. 11B.

Such LPP signal components P3a, P4a could have a negative effect on the wobble signal 37, and cause a jitter to occur in which, when the wobble signal 54 from the AGC 49 is binarized by the binary comparator 51, the resultant signal fluctuates along the time axis. That is, the jitter performance will be deteriorated.

In addition, when the optimal slice level V2 for removing the LPP signals due to the LPP outer peripheral connection part 18a from the differential signal DIFO is varied due to the amplitude fluctuation of the wobble signal, for example, when the slice level V2 based on the peak hold value PL as shown in FIG. 11B is varied, a part of the LPP signal component P1, as shown by the reference character P1a, can be left unremoved. The fact that such LPP signal component P1a is left unremoved and the amount of such unremoved component is varied will also result in the deterioration of the jitter performance. Moreover, the LPP signal component P1a left unremoved may also cause the amplitude of the wobble signal to change in a stage subsequent to the BPF 38.

If, in the case of reproducing the LPP signal 58, a pulse component P5 which projects from the peak hold value PL (slice level V2) exists in the wobble signal component due to a noise or the fluctuation of the wobble signal component, as shown in FIG. 11A, a maldetection will occur in which the pulse P5 is detected as the LPP signal 58a, as shown in FIG. 11C.

In order to prevent such maldetection of the LPP signal, in the conventional optical disk device, it is necessary to set the limit value SLL used as the slice level V2 to a value with a certain margin. However, with such margin, the LPP signal component P1a left unremoved will also be left in the wobble signal, thereby deteriorating the jitter performance. A method of separating the slice level V2 from the limit value SLL of the over level limiter 36 may be considered, but such method will cause the circuit scale to be increased.

In particular, in the optical disk 10 which has been already recorded, if RF components are included in each of the signals A, B, C and D due to the difference in the reflection factor between the mark part 12a and the non-mark part 12b, which parts represent the pit data 14 shown in FIG. 8, the amplitude of the wobble and LPP signals will be changed by a noise due to the RF components and the presence or the absence of the marks, so that the optimal limit value SLL cannot be obtained. As a result, the slice level V2 will be also changed.

Because of the reasons such as described above, it has been difficult to reproduce properly the wobble signal 54, the binary wobble signal 56, and the LPP signal 58.

The invention is based on the recognition of the above-mentioned problems, and aims at providing a slew rate limiter and an optical disk device in which the wobble and LPP signals can be properly reproduced without the need of increasing the circuit scale.

DISCLOSURE OF THE INVENTION

A slew rate limiter, according to the invention, is characterized in that a slew rate limiter comprises a MOS transistor to the gate of which an input signal is inputted, a first current source connected to the source of the MOS transistor in series with the MOS transistor, a second current source connected to the drain of the MOS transistor in series with the MOS transistor, and a capacitor connected between the source of the MOS transistor and a reference potential.

With this construction, the steep increase in the level of the input voltage, i.e., the increase (or decrease) of the input voltage at a slew rate larger than usual, will bring the MOS transistor into the ON state, so that the output voltage (the reference potential) will increase (or decrease) at a slew rate determined by the difference between the second current source and the first current source as well as by the capacitance value of the capacitor. This slew rate corresponds to at most the level of increase (or decrease) in the output voltage per unit time, so that even if the level of the input voltage increases (or decreases) steeply, the level of steep increase (or decrease) in the output voltage can be suppressed. In other words, the steep increase (or decrease) in the level of the input voltage can be eliminated.

The slew rate limiter, according to the invention, is characterized in that anyone or both of the first current source and the second current source further comprise a variable current source.

As a result, the slew rate can be varied and set at any value.

The slew rate limiter, according to the invention, is characterized in that the capacitor is further arranged to be variable in its capacitance value.

As a result, the slew rate can be varied and set at any value.

An optical disk device, according to the invention, is characterized in that an optical disk device, from an optical disk including tracks for recording information which are spirally formed from the inner periphery to the outer periphery of an optical disk in a serpentine fashion in a predetermined cycle, as well as intra track parts for reproducing address information which are connected to the tracks so as to be formed between the tracks, reproduces a wobble signal representing the serpentine information of the tracks and an address signal based on the intra track parts, wherein the optical disk device comprises a split optical sensor for detecting two-line signals by scanning the tracks with a light, a differential amplifier for generating a differential signal which includes the wobble signal and the address signal by taking the difference between two-line signals detected by the split optical sensor, and a slew rate limiter for processing the differential signal with a slew rate limited in such a manner that passage of a signal changing more steeply than the wobble signal can be prevented.

As a result, during passage of the differential signal through the slew rate limiter, a signal which changes more steeply than the wobble signal included in the differential signal can be removed. That is, the address signal and the noise component which are included in the differential signal together with the wobble signal are removed, as a result of which only the wobble signal can be outputted from the slew rate limiter.

The optical disk device, according to the invention, is characterized in that the optical disk device further comprises a band pass filter with variable pass frequency band to which the output signal from the slew rate limiter is inputted.

Thus, the wobble signal can be reproduced more properly by adjusting the pass frequency band of the band pass filter into a band which allows passage of the wobble signal alone.

The optical disk device, according to the invention, is characterized in that the pass band of the band pass filter is further variably set depending on the number of revolutions of the optical disk.

As a result, although the noise component and the wobble and address signals, which have been detected by the split optical sensor, will be different depending upon the number of revolutions of the optical disk, the variable adjustment of the pass band of the band pass filter depending on the number of revolutions enables the noise component left unremoved in the wobble signal outputted from the slew rate limiter to be removed, thereby permitting only the wobble signal optimally to be passed through.

The optical disk device, according to the invention, is characterized in that the optical disk device further comprises variable voltage generating means for generating a voltage which can be varied, an adder for adding the voltage to the output signal of the slew rate limiter, and a comparator for reproducing the address signal by comparing the differential signal with the output signal of the adder as a slice level.

As a result, since the slice level outputted from the adder assumes a waveform which is substantially conformal to and synchronized with the wobble signal extracted from the differential signal, the slice level as a whole can be increased or decreased by a voltage in such a manner that the slice level is adjusted to substantially coincide with the waveform of the wobble signal included in the differential signal. With the comparison of such slice level with the differential signal, the address signal which projects in pulse state from the wobble signal can be properly detected and reproduced.

The optical disk device, according to the invention, is characterized in that the slew rate of the slew rate limiter is further set to a larger value with the increase in the number of revolutions of the optical disk.

As a result, the wobble signal can be properly outputted from the slew rate limiter, even if the changing rate of rise/fall of the wobble signal detected by the split optical sensor is increased by the increase in the number of revolutions of the optical disk.

The optical disk device, according to the invention, is characterized in that the gain of the differential amplifier is further arranged to be variable and is variably set depending on the amplitude of the wobble and address signals which are included in the differential signal.

As a result, the amplitude of the wobble and address signals included in the differential signal, which amplitude varies depending upon the difference in the disk type, can be adjusted to correspond to the value of the slew rate limiter.

The optical disk device, according to the invention, is characterized in that the gain of the differential amplifier is further arranged to be variable and is set depending on the number of revolutions of the optical disk.

As a result, although the wobble and address signals which have been detected by means of the split optical sensor, will be different in their frequency band depending upon the number of revolutions of the optical disk, the wobble and address signals can be properly detected and included in the differential signal, by means of the variable setting of the gain value of the differential amplifier and the value of the slew rate limiter depending on the number of revolutions.

The optical disk device, according to the invention, is characterized in that an optical disk device, from an optical disk including tracks for recording information which are spirally formed from the inner periphery to the outer periphery of an optical disk in a serpentine fashion in a predetermined cycle, and intra track parts for reproducing address information which are connected to the tracks so as to be formed between the tracks, reproduces a wobble signal representing serpentine information of the tracks and an address signal based on the intra track parts, wherein the optical disk device comprises, a split optical sensor for detecting two-line signals by scanning the tracks with a light, a differential amplifier for generating a differential signal which includes the wobble and address signals by taking the difference between the two-line signals detected by the split optical sensor, and a slew rate limiter which includes a MOS transistor to the gate of which the differential signal is inputted, a first current source connected to the source of the MOS transistor in series with the MOS transistor, a second current source connected to the drain of the MOS transistor in series with the MOS transistor, and a capacitor connected between a source terminal and an output terminal of the MOS transistor, for processing the differential signal.

As a result, during passage of the differential signal through the slew rate limiter, a signal which changes more steeply than the wobble signal included in the differential signal, will be removed on the basis of the operation. That is, the address signal and the noise component which are included in the differential signal together with the wobble signal are removed, as a result of which only the wobble signal can be outputted from the slew rate limiter.

The optical disk device, according to the invention, is characterized in that anyone or both of the first and second current sources of the slew rate limiter further comprise a variable current source.

This enables the slew rate to be optionally set, so that a signal which changes more steeply than the wobble signal included in the differential signal can be removed properly by means of the slew rate limiter.

The optical disk device, according to the invention, is characterized in that the capacitor of the slew rate limiter is further arranged to be variable in its capacitance value.

This enables the slew rate to be optionally set, so that a signal which changes more steeply than the wobble signal included in the differential signal can be removed properly by means of the slew rate limiter.

The optical disk device, according to the invention, is characterized in that the optical disk device further comprises a band pass filter to which the output signal outputted from the output terminal of the slew rate limiter is inputted and which has a variable pass frequency band.

Thus, the wobble signal can be reproduced more properly by adjusting the pass frequency band of the band pass filter into a band which allows passage of the wobble signal alone.

The optical disk device, according to the invention, is characterized in that the pass band of the band pass filter is further variably set depending on the number of revolutions of the optical disk.

As a result, although the noise component and the wobble and address signals which have been detected by the split optical sensor vary depending upon the number of revolutions of the optical disk, the noise component left unremoved in the wobble signal outputted from the slew rate limiter can be removed so as to permit only the wobble signal to be passed through properly, by means of the variable adjustment of the pass band of the band pass filter depending on the number of revolutions.

The optical disk device, according to the invention, is characterized in that the optical disk device further comprises variable voltage generating means for generating a voltage which can be varied, an adder for adding the voltage to the output signal of the slew rate limiter, and a comparator for reproducing the address signal by comparing the differential signal with the output signal of the adder as a slice level.

As a result, since the slice level outputted from the adder assumes a waveform which is shaped substantially equally to and synchronized with the wobble signal extracted from the differential signal, the slice level as a whole can be increased or decreased by a voltage in such a manner that the slice level is adjusted to substantially coincide with the waveform of the wobble signal included in the differential signal. The comparison of the slice level with the differential signal enables the address signal which projects in pulse state from the wobble signal to be properly detected and reproduced.

The optical disk device, according to the invention, is characterized in that the slew rate of the slew rate limiter is further set to a larger value with the increase in the number of revolutions of the optical disk.

This enables the wobble signal to be properly outputted from the slew rate limiter, even if the changing rate of rise/fall of the wobble signal detected by the split optical sensor is increased due to the increase in the number of revolutions of the optical disk.

The optical disk device, according to the invention, is characterized in that the gain of the differential amplifier is further variable and is variably set depending on the amplitude of the wobble and address signals which are included in the differential signal.

As a result, in the differential signal, the amplitudes of the wobble and address signals which vary depending upon the difference between the disk types can be adjusted to correspond to the value of the slew rate limiter.

The optical disk device, according to the invention, is characterized in that the gain of the differential amplifier is further variable and is set depending on the number of revolutions of the optical disk.

As a result, although the wobble and address signals which have been detected by the split optical sensor will be different in their frequency band depending upon the number of revolutions of the optical disk, the wobble and address signals can be optimally detected so as to be included in the differential signal, by means of the variable adjustment of the gain value of the differential amplifier and the value of the slew rate limiter depending on the number of revolutions.

BEST MODE FOR CARRYING OUT THE INVENTION

An embodiment of the invention will now be described hereinafter with reference to the drawings. In each figure referred to in the following description, identical parts are provided with the same reference numerals.

Figure 1:
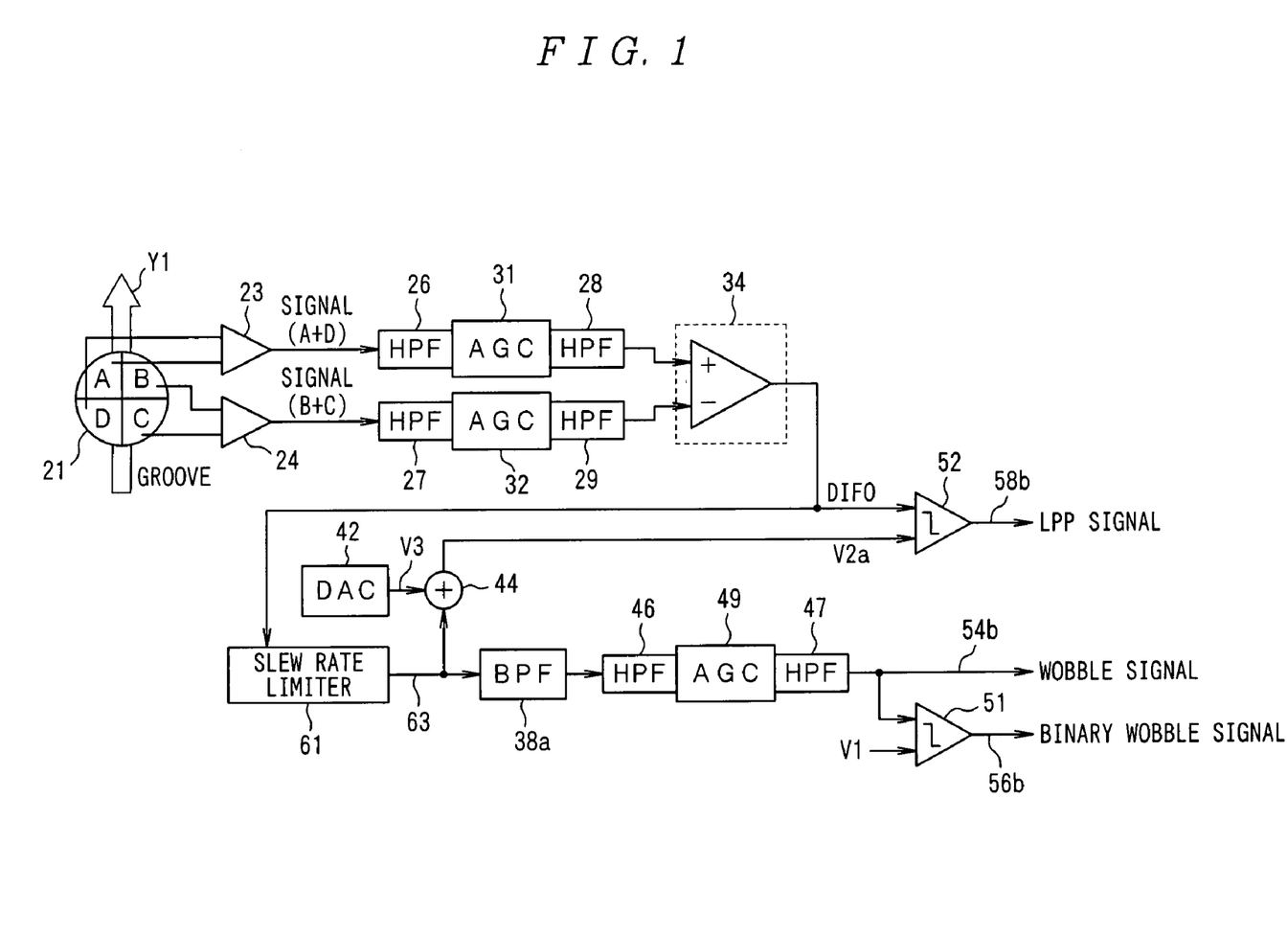
FIG. 1 is a block diagram showing a construction of a wobble and LPP signal reproduction circuit of an optical disk device according to an embodiment of the invention.

FIG. 1 shows a wobble and LPP signal reproduction circuit 60 according to an embodiment of the invention, which is characterized in that a slew rate limiter (slew rate limiting circuit) 61 is employed in place of an over level limiter 36 of a reproduction circuit 20 shown in FIG. 10, in that a level hold section 40 shown in FIG. 10 is removed and a signal output terminal of the slew rate limiter 61 is connected to an adder 44 as shown in FIG. 1, and in that a band pass filter of variable frequency band type is employed as BPF 38a which is connected to the output side of the slew rate limiter 61.

That is, the reproduction circuit 60 according to an embodiment of the present invention is arranged to comprise a quadripartite sensor 21, operational amplifiers 23, 24, AGCs 31, 32 to which input and output sides HPFs 26, 27, 28 and 29 are connected, a gain variable differential amplifier 34 with a variable frequency type LPF, a slew rate limiter 61, a BPF 38a, a DAC 42, an adder 44, an AGC 49 to which input and output sides HPFs 46, 47 are connected, and binary comparators 51, 52.

The slew rate limiter 61 is arranged to be able to change the slew rate (the changing rate of rise/fall of the output signal) depending on the number of revolutions of DVD-R/RW 10, and the slew rate is limited so as to allow passage of the wobble signal but to prevent passage of the LPP signal, both signals being included in the differential signal DIFO outputted from the differential amplifier 34. This limitation is performed in such a manner that the slew rate is increased with the increase in the number of revolutions. In addition, in order to change the slew rate depending on the number of revolutions, it is arranged that the slew rate can be set in steps of, for example, 125 mV for 125 to 2000 mV/μsec.

Figure 2A:
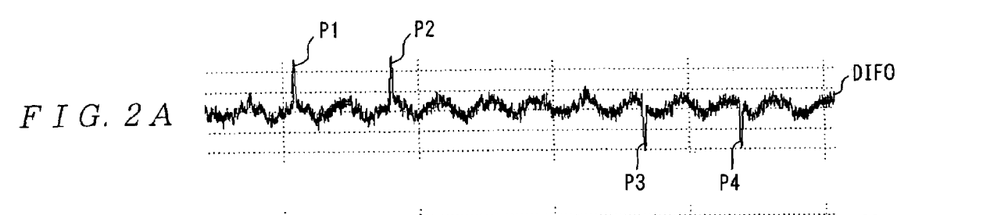
FIGS. 2A to 2C are diagrams showing each signal in the wobble and LPP signal reproduction circuit of the optical disk device.
Figure 2B:
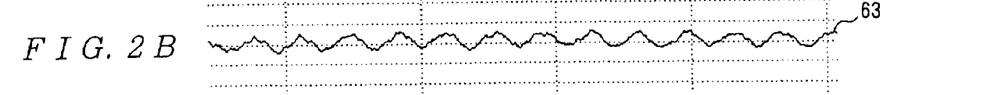

Limiting the slew rate in this manner prevents passage of the LPP signals P1 to P4 which are included in the differential signal DIFO shown in FIG. 2A, and permits only the component of the wobble signal 63 shown in FIG. 2B to be passed and outputted. In this slew rate processing, whisker-like amplitude components which are superimposed on the wobble component of the differential signal DIFO, shown in FIG. 2A, can also be removed as shown in FIG. 2B. Such amplitude components which, as described with respect to an prior art form, are changed steeply in their amplitude values by a noise due to the RF components and by the presence or absence of the marks, are prevented from passing and removed, with the slew rate being limited as described above.

Figure 3:
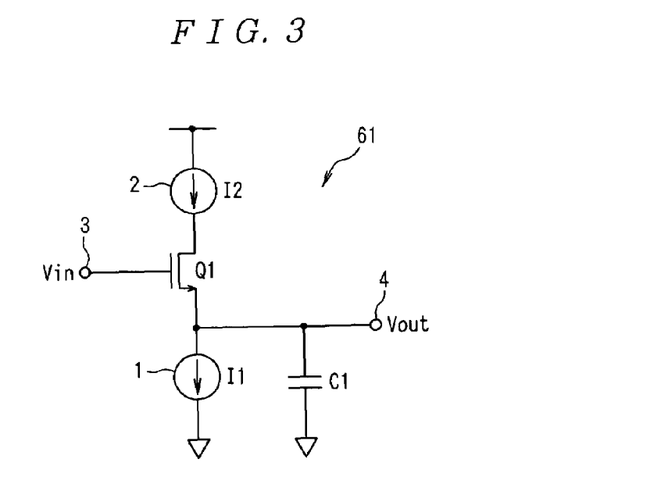
FIG. 3 is a diagram showing a first exemplary construction of a slew rate limiter for use in the wobble and LPP signal reproduction circuit of the optical disk device.

FIG. 3 shows an exemplary circuit construction of the slew rate limiter 61, which consists of a MOS transistor Q1, a current source 1 for feeding a constant current I1, a current source 2 for feeding constant current I2, and a capacitor C1 serving as a load of the MOS transistor Q1.

Figure 4:
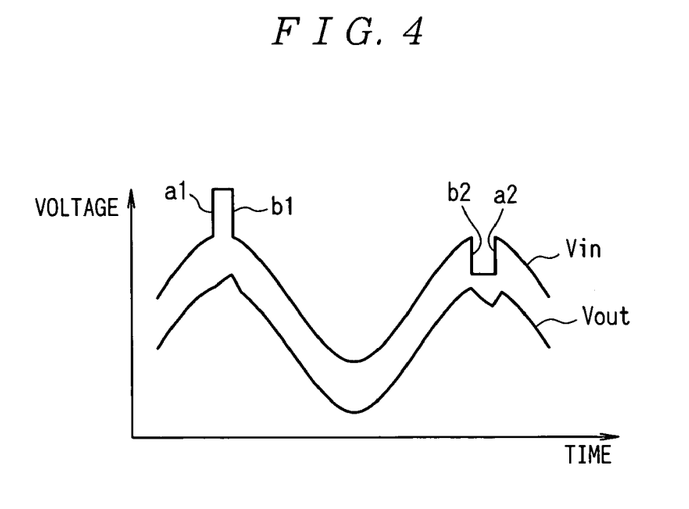
FIG. 4 is a waveform chart of input and output voltages of the slew rate limiter in the first exemplary construction.

When the level of the input voltage Vin increases steeply as shown by a1, a2 in FIG. 4, the MOS transistor Q1 will become ON state, as a result of which the output voltage Vout will increase with a slew rate which is determined by the difference between the constant currents I2 and I1, i.e., (I2-I1) and the capacitance value C1 of the capacitor C1. On the other hand, when the level of the input voltage Vin decreases steeply as shown by b1, b2 in FIG. 4, the MOS transistor Q1 will become OFF state, as a result of which the output voltage Vout will decrease with a slew rate which is determined by the constant current I1 and a capacitance value C1.

Thus, the pulse state noise components a1, b1, and b2, a2 which are formed in the input voltage Vin will be substantially removed, so that only a signal substantially equal to the input voltage Vin can be outputted as the output voltage Vout. That is, the slew rate limiter 61 removes the LPP signals P1 to P4 shown in FIG. 2A, and outputs substantially only the wobble signal 63, as shown in FIG. 2B.

Figure 5:
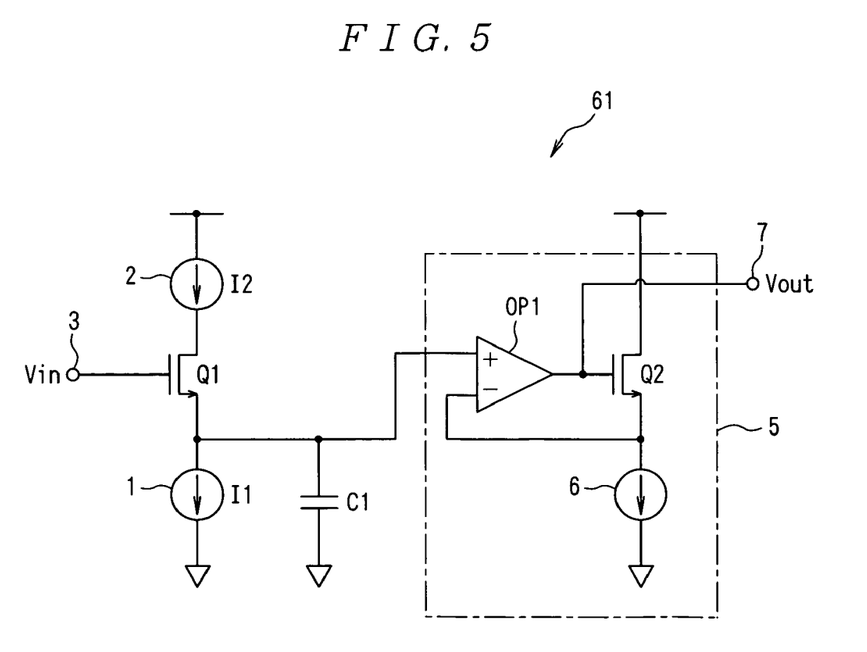
FIG. 5 is a diagram showing a second exemplary construction of the slew rate limiter for use in the wobble and LPP signal reproduction circuit of the optical disk device.

Moreover, as shown in FIG. 5, a circuit in which an output level compensation circuit 5 for compensating for the level of the output voltage Vout is additionally attached to the circuit shown in FIG. 3 may be employed as the slew rate limiter 61. The output level compensation circuit 5 is constructed to comprise an operation a1 amplifier OP1, an N-type MOS transistor Q2 and a current source 6. The operational amplifier OP1 also constitutes a voltage-follower with the MOS transistor Q2.

The differential amplifier 34 which is connected to be followed by such slew rate limiter 61, subjects the signals (A+D) and (B+C) which are inputted from the HPFs 28, 29, to the AGC (automatic gain control) in such a manner that the amplitude of the RF components due to the recorded pits can be kept constant, and thereafter takes the difference between the signals so as to form the wobble and LPP components. Since the outputs thus obtained will be different depending upon the disk type, it is arranged that the gain values of, for example, 0.66, 1.33 and 2.66 times are set for achieving the optimal gain selection.

Moreover, with the gain selection depending on the number of revolutions, it is arranged that the modification width of the value of the slew rate limiter 61 can be reduced, so that the wobble and LPP components can be optimally detected.

Further, it is also arranged that the BPF 38a which is connected so as to follow the slew rate limiter 61, can be varied in its frequency band corresponding to the number of revolutions, with the frequency being switched by means of an input clock and a register. Such selection of the frequency band enables the wobble component to be optimally detected from the wobble signal 63.

In addition, the adder 44 adds the DC offset voltage V3 from the DAC 42 to the wobble signal 63 outputted from the slew rate limiter 61, as a result of which the slice level V2a for the binary comparator 52 is arranged to be generated.

Figure 2C:
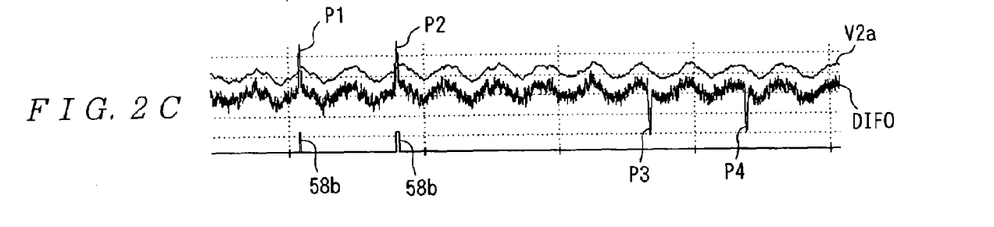

It is also arranged that the slice level V2a can be varied by means of the offset voltage V3 in steps of, for example, 25 mV from 0 to 375 mV. Thus, since the slice level V2a is generated on the basis of the wobble signal 63 formed through the extraction of the wobble component from the differential signal DIFO, it assumes, as shown in FIG. 2C, a waveform shaped substantially equally to and in synchronism with the sinusoidal wobble component included in the differential signal DIFO. Accordingly, the slice level V2a can be arranged to be increased or decreased by means of the offset voltage V3, so as to substantially coincide with the waveform of the wobble component.

With reference to the reproduction circuit 60 with such construction in the optical disk device, the operation for reproducing the wobble and LPP signals from DVD-R/RW 10 will be described as follows.

However, it is assumed that after the recording of information onto DVD-R/RW 10, the AGCs 31, 32 are operated to align the amplitudes of signals (A+D) and (B+C), but the response rate of the output level detection circuit of the AGCs 31, 32 is selected to be in a frequency band on which the LPP signal exerts no influence and which is subjected to a band restriction by means of a loop filter. It is also assumed that since the AGCs 31, 32 may be saturated before the recording of information, the AGCs 31, 32 are switched to have a fixed gain and to be used, and the DC component is removed by means of the HPFs 26 to 29 before and after the AGCs 31, 32 in order to ensure a sufficient operation range.

First, the signals A, B, C and D taken up by the quadripartite sensor 21 are added in the circumferential direction, so that the signals (A+D) and (B+C) are generated. The signals (A+D) and (B+C) are inputted into the HPFs 26, 27 in which their DC offset components are removed, and thereafter the amplitudes of both signals are aligned in the AGCs 31, 32. The signals (A+D) and (B+C) which have been set constant in their amplitude are inputted into the differential amplifier 34 by way of the HPFs 28, 29. In the differential amplifier 34, the difference between the signals (A+D) and (B+C) is taken and is processed with a predetermined gain and through the frequency variable LPF, so that the differential signal DIFO can be obtained.

From the differential signal DIFO, the LPP components P1 to P4 shown in FIG. 2A are removed by the slew rate limiter 61, as a result of which the remaining wobble signal 63 shown in FIG. 2B is outputted into the adder 44 and BPF 38a. The adder 44 adds the offset voltage V3 to the wobble signal 63 and hence the slice level V2a is obtained as shown in FIG. 2C. The comparison of the slice level V2a with the differential signal DIFO in the binary comparator 52 enables the binarized LPP signal 58b to be reproduced.

On the other hand, unnecessary components such as a noise, which have been left unremoved in the wobble signal 63, are removed in the BPF 38a and thereafter the DC offset component and a noise, etc. are removed in the circuit with the HPF 46, the AGC 49 and the HPF 47, and the wobble signal 63 is rendered to have a fixed amplitude. With this processing, the wobble signal 54b is reproduced. The wobble signal 54b is inputted into the binary comparator 51 and compared with the slice level V1 so as to be binarized, as a result of which the binary wobble signal 56b is reproduced.

It should be noted that although the quadripartite sensor 21 is arranged to detect two-line signals in the above description, other split optical sensor may also be employed to detect such two-line signals.

The wobble and LPP signal reproduction circuit 60 of the optical disk device according to an embodiment of the invention is constructed in such a manner that the slew rate of the slew rate limiter 61 is limited in order to prevent passage of a signal which changes more steeply than the wobble signal included in the differential signal DIFO generated by the differential amplifier 34, and that the differential signal DIFO is processed with the resultant slew rate so as to be outputted. With such processing, when the differential signal DIFO passes through the slew rate limiter 61, a signal which is included in the differential signal DIFO and which changes more steeply than the wobble signal is removed. That is, the address signal and the noise component which are included in the differential signal DIFO together with the wobble signal are removed, so that only the wobble signal can be outputted from the slew rate limiter 61. Thus, the wobbling signal can be properly reproduced.

Since there is also provided the variable pass band BPF 38a to which the output signal of the slew rate limiter 61 is inputted, and of which frequency band can be limited, the pass frequency band of BPF 38a can be adjusted into a band which allows passage of the wobble signal alone, thereby enabling the wobble signal to be reproduced more properly.

In addition, the offset voltage V3 is generated by the DAC 42, which voltage is added by the adder 44 with the wobble signal 63 from the slew rate limiter 61, and this addition signal, used as the slice level V2a, is arranged to be compared with the differential signal DIFO in the comparator 52, for reproducing the LPP signal 58b. Since the slice level V2a outputted from the adder 44 assumes a waveform which is substantially conformal to and in synchronism with the wobble signal extracted from the differential signal DIFO, the slice level V2a as a whole is increased or decreased by means of a voltage in such a manner that the slice level can be substantially coincident with the waveform of the wobble signal included in the differential signal DIFO. The comparison between the slice level V2a thus obtained and the differential signal DIFO enables the LPP signal 58b, which projects from the wobble signal in pulse state, to be properly detected.

Since the slew rate of the slew rate limiter 61 is arranged to be set to a larger value with the increase of the number of revolutions of the optical disk 10, even if the number of revolutions of the optical disk 10 is increased to cause the increase of the changing rate of rise/fall of the wobble signal detected by the split optical sensor, the wobble signal can also be outputted properly from the slew rate limiter 61.

The differential amplifier 34, the gain of which is arranged to be varied, is also capable of absorbing the variation in the amplitude of the differential signal depending upon the disk type, and of reducing the set value of the slew rate required.

Changing the pass band of the BPF 38a depending on the number of revolutions of the optical disk 10 also enables the noise component left unremoved in the wobble signal 63 outputted from the slew rate limiter 61 to be removed, and only the wobble signal to be passed optimally.

Figure 6A:
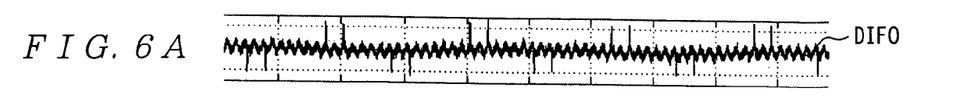
FIGS. 6A to 6F are waveform charts in the case of a verification of the effect of an embodiment of the invention.
Figure 6B:
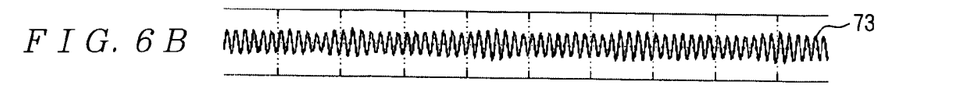

The waveforms representing a verification result of the effects described above are shown in FIGS. 6A to 6F and FIGS. 7A to 7F. However, FIGS. 7A to 7F are enlarged views of the section 71 shown in FIGS. 6A to 6F. In the FIGS. 6A to 6F and 7A to 7F, the waveforms shown in FIGS. 6A and 7A are the differential signal DIFO outputted from the differential amplifier 34. The waveforms shown in FIGS. 6B and 7B represent a comparison between three signal waveforms 73 including, a wobble signal (hereinafter referred to as a first conventional wobble signal) which is obtained by permitting the differential signal DIFO from the differential amplifier 34 to pass directly through the BPF 38 without the over level limiter 36 being used in the conventional circuit arrangement shown in FIG. 10, a wobble signal (hereinafter referred to as a second conventional wobble signal) which is obtained by permitting the differential signal DIFO to pass through the BPF 38 via the over level limiter 36 in the conventional circuit arrangement shown in FIG. 10, and a wobble signal (hereinafter referred to as a wobble signal of the invention) which is obtained by permitting the differential signal DIFO to pass through the BPF 38a via the slew rate limiter 61 in the circuit arrangement according to an embodiment of the invention shown in FIG. 1.

Figure 6C:
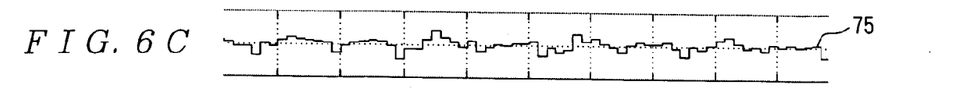
Figure 6D:
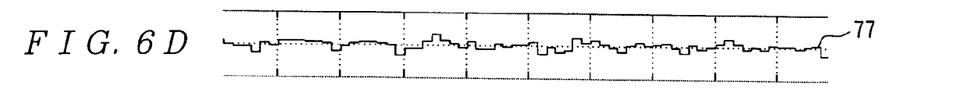
Figures 6E, 6F:
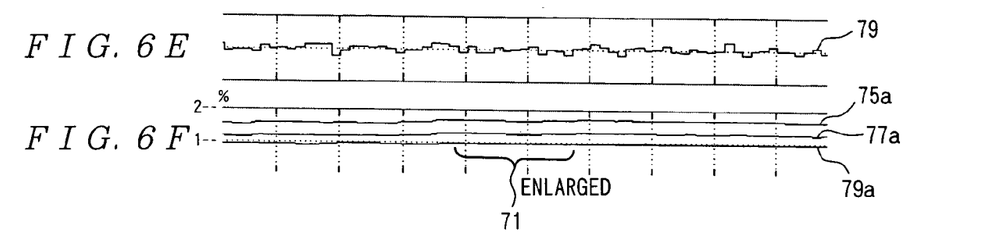
Figure 7A:
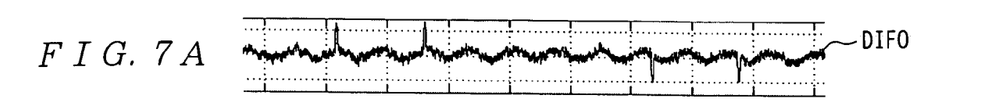
FIGS. 7A to 7F are enlarged views of the predetermined section shown in FIGS. 6A to 6F.
Figure 7B:
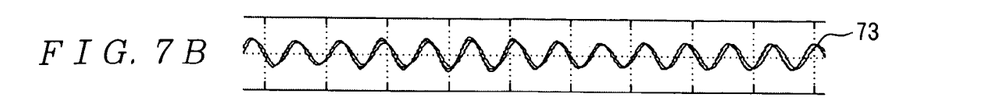
Figure 7C:
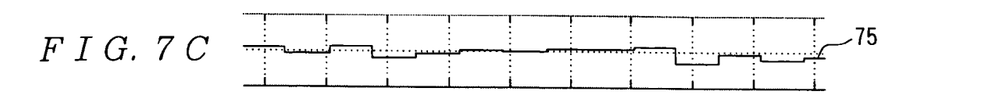
Figure 7D:
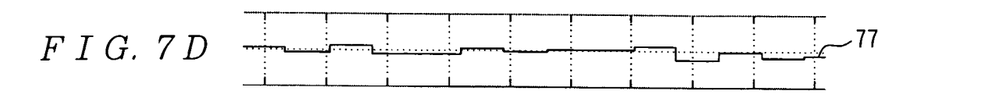
Figure 7E:
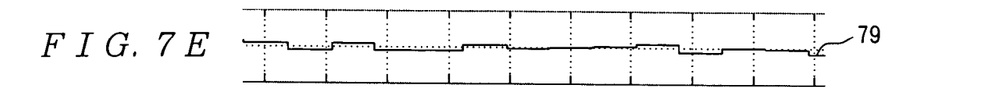

The waveforms shown in FIGS. 6C and 7C are waveforms 75 representing the difference of the periods between the first conventional wobble signal and the ideal wobble signal. The waveforms shown in FIGS. 6D and 7D are waveforms 77 representing the difference of the periods between the second conventional wobble signal and the ideal wobble signal. The waveforms shown in FIGS. 6E and 7E are waveforms 79 representing the difference of the periods between the wobble signal of the invention and the ideal wobble signal.

Figure 7F:
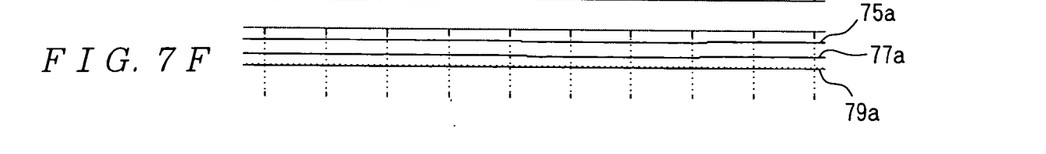

There are shown in FIGS. 6F and 7F waveforms 75a, 77a and 79a illustrating the jitter ratios (%), each of which has been obtained by dividing the standard deviation individually obtained from the above differential waveforms 75, 77 and 79 by the period of the ideal wobble signal.

It can be seen from the result shown in FIGS. 6F and 7F, that the waveform 79a obtained according to an embodiment of the invention, has a jitter ratio (%) substantially equal to 1, representing the most preferred characteristic. From this, it can be also seen that for the detection of the LPP signal 58b, the offset value from DAC 42 can be optimized mainly for the purpose of facilitating the detection, and its influence on the wobble signal need not be taken into account.

In the optical disk device according to the invention, the conventional construction, in which the slice level and the limit value of the over level limiter are set separately and hence the circuit scale is increased, is not adopted, and the level hold section 40 which is a component employed in the conventional construction is also removed, so that the corresponding reduction in the circuit scale is possible.

INDUSTRIAL APPLICABILITY

The employment of the slew rate limiter, according to the invention, eliminates the use of diode as used in the conventional circuit, so that the corresponding reduction in the number of components is possible in comparison with conventional circuit. The elimination of the use of diode as used in the conventional circuit is also suitable for the construction by means of a CMOS integrated circuit. Moreover, the MOS transistor, which is employed in the slew rate limiter according to the invention, can greatly increase the input impedance, thereby eliminating a buffer circuit or the like, in the input side.

In an optical disk device according to the invention, the slew rate limiter limits the slew rate so as to restrict passage of a signal which changes more steeply than the wobble signal included in the differential signal generated by the differential amplifier, and the differential signal is processed with the slew rate limited in such a manner so as to be outputted. With this processing, during passage of the differential signal through the slew rate limiter, a signal which changes more steeply than the wobble signal included in the differential signal can be removed. That is, the address signal and the noise component which are included in the differential signal together with the wobble signal are removed, and hence only the wobble signal can be outputted from the slew rate limiter. Consequently, the wobble signal can be properly reproduced.

The invention claimed is:

1. A slew rate limiter comprises:
    a MOS transistor to the gate of which an input signal is inputted;
    a first current source connected to the source of said MOS transistor in series with said MOS transistor;
    a second current source connected to the drain of said MOS transistor in series with said MOS transistor; and
    a capacitor connected between the source of said MOS transistor and a reference potential,
    characterized in that,
    upon an increase in a wave form of said input signal, an output voltage of said MOS transistor increases with a slew rate which is determined by a difference between a current value of said first current source and a current value of said second current source, and a capacitance value of said capacitor, and
    upon a decrease in the wave form of said input signal, the output voltage of said MOS transistor decreases with a slew rate which is determined by the current value of said first current source and the capacitance value of said capacitor.

2. The slew rate limiter according to claim 1, characterized in that anyone or both of said first current source and said second current source comprise a variable current source.

3. The slew rate limiter according to claim 1, characterized in that said capacitor is variable in its capacitance value.

4. An optical disk device, from an optical disk including tracks for recording information which are spirally formed from the inner periphery to the outer periphery of the optical disk in a serpentine fashion in a predetermined cycle, as well as intra track parts for reproducing address information which are connected to said tracks so as to be formed between said tracks, for reproducing a wobble signal representing serpentine information of said tracks and an address signal based on said intra track parts,
    characterized in that said optical disk device comprises:
    a split optical sensor for detecting two-line signals by scanning said tracks with a light;
    a differential amplifier for generating a differential signal which includes said wobble signal and said address signal by taking the difference between the two-line signals detected by said split optical sensor; and
    a slew rate limiter for processing said differential signal at a slew rate limited in such a manner that passage of a signal changing more steeply than said wobble signal can be prevented.

5. The optical disk device according to claim 4, characterized in that the optical disk device comprises a band pass filter with variable pass frequency band to which the output signal from said slew rate limiter is inputted.

6. The optical disk device according to claim 5, characterized in that the pass band of said band pass filter is variably set depending on the number of revolutions of said optical disk.

7. The optical disk device according to claim 4, characterized in that the optical disk device comprises:
    variable voltage generating means for generating a voltage which can be varied;
    an adder for adding said voltage to an output signal of said slew rate limiter; and
    a comparator for reproducing said address signal by comparing said differential signal with an output signal of said adder as a slice level.

8. The optical disk device according to claim 4, characterized in that the slew rate of said slew rate limiter is set to a larger value with the increase in the number of revolutions of said optical disk.

9. The optical disk device according to claim 4, characterized in that the gain of said differential amplifier is variable and is variably set depending on the amplitude of said wobble and address signals which are included in said differential signal.

10. An optical disk device, from an optical disk including tracks for recording information which are spirally formed from the inner periphery to the outer periphery of the optical disk in a serpentine fashion in a predetermined cycle, as well as intra track parts for reproducing address information which are connected to said tracks so as to be formed between said tracks, for reproducing a wobble signal representing serpentine information of said tracks and an address signal based on said intra track parts, characterized in that said optical disk device comprises:

a split optical sensor for detecting two-line signals by scanning said tracks with a light;

a differential amplifier for generating a differential signal which includes said wobble signal and said address signal by taking the difference between the two-line signals detected by said split optical sensor; and a slew rate limiter which includes a MOS transistor to the gate of which said differential signal is inputted, a first current source connected to the source of said MOS transistor in series with said MOS transistor, a second current source connected to the drain of said MOS transistor in series with said MOS transistor, and a capacitor connected between a source terminal and a reference potential of said MOS transistor, for processing said differential signal;

said slew rate limiter is a circuit that upon an increase in a wave form of said differential signal wave form, an output voltage of said MOS transistor increases with a slew rate which is determined by a difference between a current value of said first current source and a current value of said second current source, and a capacitance value of said capacitor, and upon a decrease in the wave form of said differential signal wave form, the output voltage of said MOS transistor decreases with a slew rate which is determined by the current value of said first current source and the capacitance value of said capacitor.

11. The optical disk device according to claim 10, characterized in that anyone or both of the first current source and the second current source of said slew rate limiter comprise a variable current source.

12. The slew rate limiter according to claim 10, characterized in that the capacitor of said slew rate limiter is variable in its capacitance value.

13. The optical disk device according to claim 10, characterized in that optical disk device comprises a band pass filter to which the output signal outputted from the output terminal of said slew rate limiter is inputted and which has a variable pass frequency band.

14. The optical disk device according to claim 13, characterized in that the pass band of said band pass filter is variably set depending on the number of revolutions of said optical disk.

15. The optical disk device according to claim 10, characterized in that the optical disk device comprises:

variable voltage generating means for generating a voltage which can be varied;

an adder for adding said voltage to an output signal of said slew rate limiter; and a comparator for reproducing said address signal by comparing said differential signal with an output signal of said adder as a slice level.

16. The optical disk device according to claim 10, characterized in that the slew rate of said slew rate limiter is set to a larger value with the increase in the number of revolutions of said optical disk.

17. The optical disk device according to claim 10, characterized in that the gain of said differential amplifier is variable and is variably set depending on the amplitude of said wobble and address signals which are included in said differential signal.

18. The slew rate limiter according to claim 1, characterized in that an output level compensation circuit is connected between the source of said MOS transistor and an output terminal of said slew rate limiter.

19. The optical disk device according to claim 10, characterized in that an output level compensation circuit is connected between the source of said MOS transistor and an output terminal of said slew rate limiter.

* * * * *